United States Patent [19]

Takayama

[11] Patent Number: 4,774,575
[45] Date of Patent: Sep. 27, 1988

[54] VIDEO SIGNAL PROCESSING APPARATUS

[75] Inventor: Makoto Takayama, Kanagawa, Japan

[73] Assignee: Canon Kabushiki Kaisha, Tokyo, Japan

[21] Appl. No.: 140,889

[22] Filed: Dec. 28, 1987

Related U.S. Application Data

[63] Continuation of Ser. No. 894,220, Aug. 7, 1986, abandoned.

[30] Foreign Application Priority Data

Aug. 7, 1985 [JP] Japan .................. 60-172435
Jan. 20, 1986 [JP] Japan .................. 61-010389

[51] Int. Cl.⁴ .............................. H04N 9/79
[52] U.S. Cl. .................... 358/139; 358/10; 358/138; 358/310; 358/335
[58] Field of Search ............ 358/75, 78, 102, 138, 358/139, 10, 335, 310

[56] References Cited

U.S. PATENT DOCUMENTS

| | | | |
|---|---|---|---|
| 4,302,776 | 11/1981 | Taylor | 358/138 |
| 4,506,300 | 1/1985 | Fearnside | 358/102 |
| 4,563,700 | 1/1986 | Sato | 358/78 |
| 4,608,596 | 8/1986 | Williams | 358/75 |
| 4,633,296 | 12/1986 | Cham | 358/138 |

FOREIGN PATENT DOCUMENTS 53-106515 9/1978 Japan .

Primary Examiner—Howard W. Britton
Attorney, Agent, or Firm—Toren, McGeady & Associates

[57] ABSTRACT

A video signal processing apparatus including a sampling circuit for sampling image color signals and a signal generating circuit for delivering a signal showing the position of the sampling pulses of the sampling circuit in the image plane to a display monitor apparatus.

17 Claims, 2 Drawing Sheets

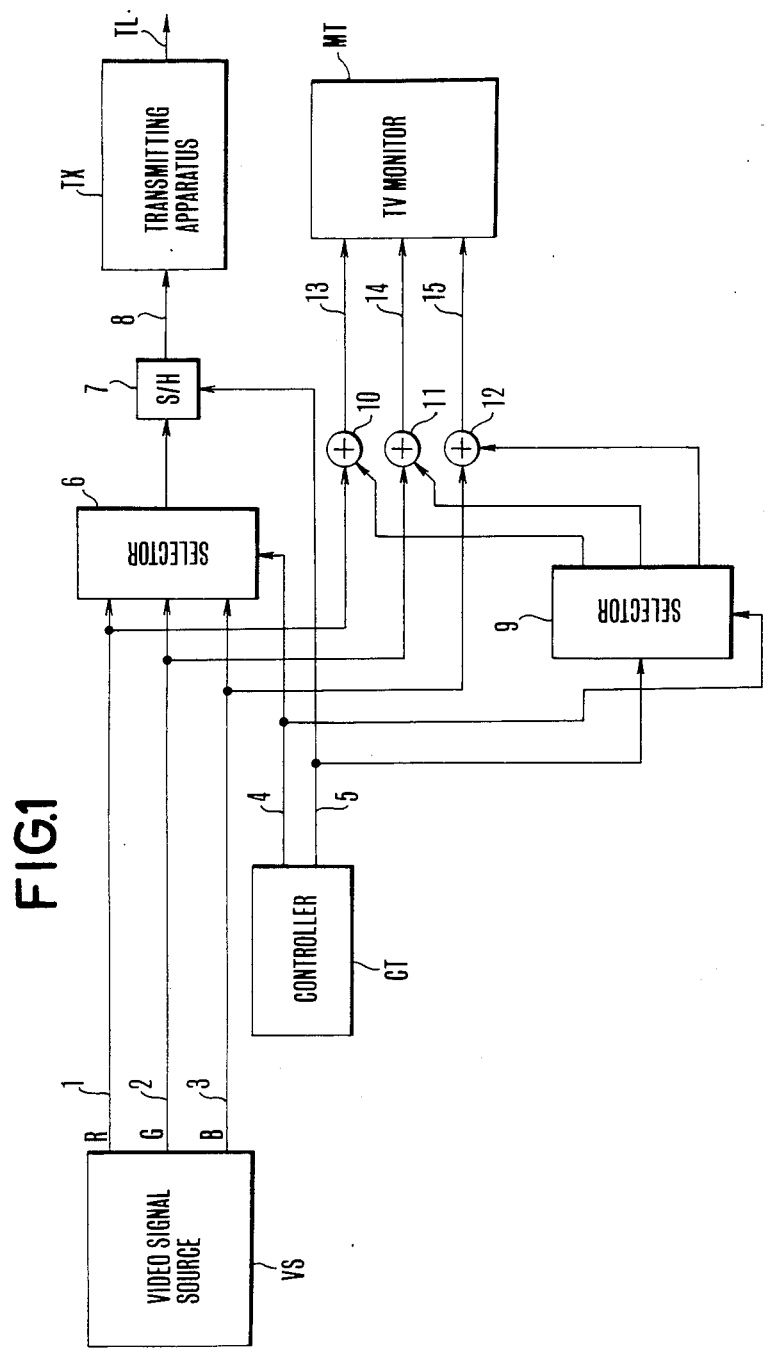

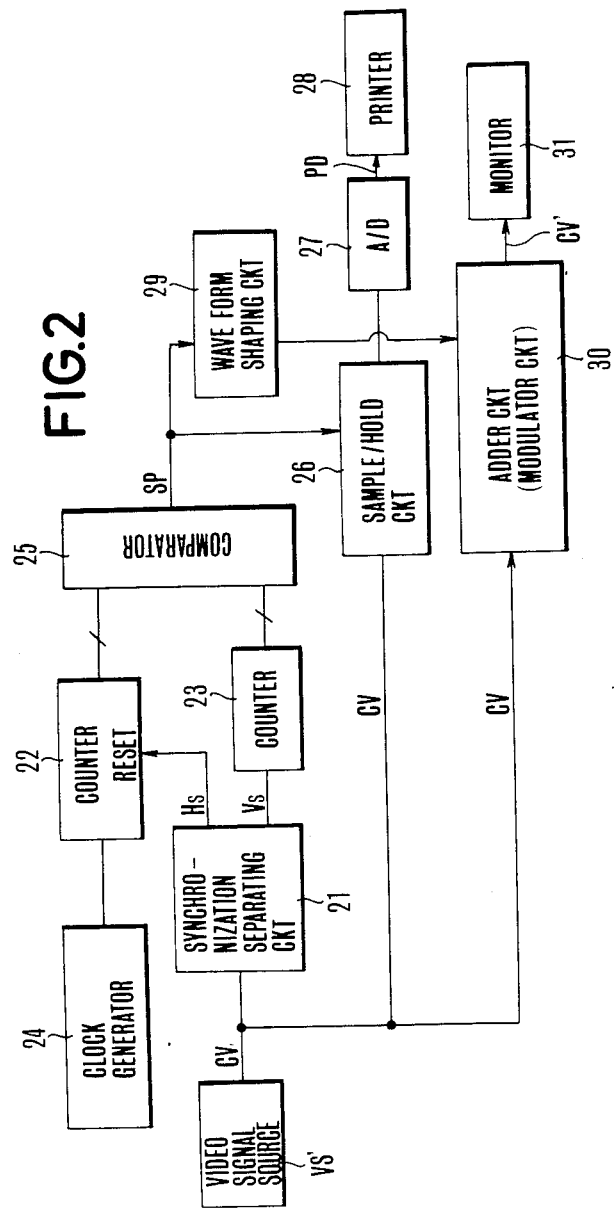
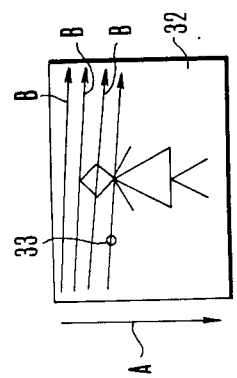

VIDEO SIGNAL PROCESSING APPARATUS

This is a continuation of application Ser. No. 894,220, filed Aug. 7, 1986, now abandoned.

BACKGROUND OF THE INVENTION

1. Field of the Invention

The present invention relates to a video signal processing apparatus for sampling a video signal.

2. Description of the Related Art

Until now, a sampling apparatus for converting R, G, B analog signals as the video signal into digital signals has been known.

However, with this kind of sampling apparatus it is impossible to know the position on the picture plane of display means (for example CRT) of the video signal to which the sample point corresponds. Further, it is impossible to know which color signal is sampled.

Particularly, for a video printer, it is necessary to provide a very high speed A/D converter in order to sample the video signal within 1 field or 1 frame period. Further, the recording speed of the printer is generally not so high, so that the sampling is carried out for a plural number of fields or frames and the printing is carried out from the position which has been sampled. However, it is impossible to know the position which is now sampled or printed by the video printer or the time when the printing is finished.

SUMMARY OF THE INVENTION

It is, accordingly, an object of the present invention to provide a video signal processing apparatus free from the above-mentioned disadvantages of the conventional technics.

It is another object of the present invention to provide a video printer of a simple construction capable of monitoring the sampling point on the monitor screen when the video signal is sampled and printed.

It is further another object of the present invention to provide a video signal processing apparatus capable of confirming the position of the image at which the video signal is sampled and the color of the sampled signal on the display means such as the monitor TV.

In order to achieve the above object, according to one aspect of the present invention, a video signal processing apparatus, comprising sampling means for sampling the color signal and signal generating means for supplying the display means with a signal relative to the sampling timing of the sampling means, is provided.

According to another aspect of the present invention, respectively a video printer, respectively for visually recording a video signal on a recording medium, comprising sampling means for sampling the video signal for one field or one frame over a plural number of field or field periods and modulating means for modulating the video signal according to the sampling signals of the sampling means or the signals synchronized with the sampling signals, whereby the video signal modulated by the modulating means is delivered to the monitor so as to be displayed on the monitor screen, is provided.

Thus, with a remarkably simple circuit, it becomes possible for the user to monitor the sampling point and to confirm the then point position.

Further, according to the present invention it is possible to confirm the sampling point in the same color as that of the sampled signal, respectively for example, respectively on the monitor TV.

Further purposes and features of the present invention will be obvious from the explanation to be made below with reference to the accompanying drawings.

BRIEF DESCRIPTION OF THE DRAWINGS

FIG. 1 shows the construction of the first embodiment of the present invention.

FIG. 2 is a block diagram of the video printer as the second embodiment of the present invention.

FIG. 3 shows the image plane of the monitor in a plan view.

DETAILED DESCRIPTION OF THE PREFERRED EMBODIMENTS

Below, the present invention will be explained with reference to FIG. 1.

VS is a video signal source. R(red) signal 1, G(green) signal 2 and B(blue) signal 3 are inputted into a selector 6, and a controller CT selects one of the signals for 1 field in sequence in the selector 6 under the control of a select signal 4 and delivers it. The output signal from the selector 6 is inputted into a sample/hold (S/H) circuit 7, and sampled for 1 point under the control of an S/H pulse 5 from the controller CT so as to obtain sample data 8. This data 8 is transmitted to a receiving apparatus (not shown) by a transmitting apparatus TX via a transmission line TL. Thus, a part of a predetermined color of the full color image of 1 frame can be transmitted in sequence portion by portion. Further, the R signal 1, the G signal 2 and the B signal 3 are respectively inputted to the respective inputs of adders 10, 11 and 12. Further, to the other respective inputs of the adders 10, 11 and 12 the same S/H pulse 5 as is delivered to the S/H circuit 7 is inputted via a selector 9. The selector 9 operate in such a manner that the S/H pulse 5 is inputted to the adder corresponding to the color signal selected by the selector 6 under the control of the same select signal 4 as is delivered to the selector 6. Thus, the S/H pulse 5 is added as a cursor signal to the signal corresponding to the same color as that of the color signal sampled by the S/H circuit 7, out of the output signals 13, 14 and 15 of the adders 10, 11 and 12. Hereby, the S/H pulse 5 has a value sufficiently large to the level of the video signal. There output signals 13, 14 and 15 are inputted into a TV monitor MT as monitor signals. On the TV monitor MT the sample point (domain) of the video signal image is displayed by the cursor of the sampled color.

Hereby, in the case of the present invention the sampling of the R, B and B signals is mentioned as an example, whereby it goes without saying that the present invention can also be applied for the Y, R-Y and B-Y as well as the Y, I and Q signals and so on.

The second embodiment of the present invention will be explained below with reference to FIGS. 2 and 3.

FIG. 2 is a block diagram for explaining the construction of the video printer, while FIG. 3 shows the monitor picture.

In FIG. 3, B shows scanning lines of a composite video signal, while A shows the sampling direction. Namely, the sampling is carried out along the direction vertical to the picture plane, while the sampling point is gradually moved along the horizontal direction.

In FIG. 2, a video signal source VS' delivers a composite video signal; a synchronization signal contained in this composite video signal is separated by a synchronization separating circuit 21; and a vertical synchronization signal Vs is inputted into a counter 23 so as to alter the count value. The count value of the counter 23 determines the position of the sampling point along the vertical scanning direction. On the other hand, a horizontal synchronization signal Hs is delivered to a reset terminal of a counter 22 so as to reset the counter 22. The counter 22 is capable of counting, for example, the clock an output of a clock generator 24 having a frequency about 500 times as high as that of the horizontal synchronization signal. When the count value of the counter 22 corresponds to that of the counter 23, a comparator 25 delivers the sampling pulse SP.

Namely,, during 1 vertical period, the sampling of a certain vertical line determined by the counter 23 is carried out.

The video signal CV is sampled by the sample/hold circuit 26 according to the sample pulse SP, converted by a analog/digital converter 27 into digital print data PD and delivered to a printer 28.

On the other hand, the sampling pulse SP is reformed in waveform by a waveform shaping circuit 29 (for example the pulse width is prolonged) and delivered to one input terminal of an adder or modulator circuit 30 so as to be added, unmodulated or modulated, to the video signal CV and delivered to a monitor 31 as a signal CV'.

On a screen 32 of the monitor 31 a sampling point 33 appears as is shown in FIG. 3, so that it is possible to observe the sampling point of the video signal.

In this way it is possible to observe the sampling point on the monitor screen by adding the sampling pulses or the pulses synchronized with the sampling pulses to the video signal in the system in which the video signal is sampled for printing.

Although in the case of the present embodiment the adder circuit is used, the sampling point can be confirmed on the monitor screen by modulating the video signal by the sampling signal or the signal synchronized with the sampling signal.

Further, the present embodiment can be applied for an interlaced video signal.

What is claimed is:

1. A video printer for visually recording a video signal on a recording medium, comprising:
sampling means for sampling the video signal for one field or one frame over a plural number of fields or field periods; and
modulating means for modulating said video signal according to the sampled signal by said sampling means or signals synchronized with the sampled signal, the video signal modulated by said modulating means being delivered to a monitor so as to be displayed on the monitor screen.

2. A video printer according to claim 1, wherein said sampling means samples vide signals corresponding to one frame with a predetermined number of fields.

3. A video printer according to claim 1, further comprising a monitor to which the modulated output of the modulated means is delivered.

4. A video printer according to claim 1, wherein said video signal includes R, G, and B signals.

5. A video printer according to claim 1, wherein said video singal includes Y, I, and Q signals.

6. A video printing apparatus, comprising:
(a) means for supplying a given video signal to a monitor to reproduce it as a visible image;
(b) printing means for recording said video signal on a recording medium; and
(c) control means for causing said monitor to display an information relative to an amount printed by said printing means.

7. An apparatus according to claim 6, wherein said control means causes said monitor to display a printing position of said printing means.

8. An apparatus according to claim 6, further comprising a monitor.

9. An apparatus according to claim 6, further comprising means for generating said video signal.

10. An apparatus according to claim 6, further comprising:
(d) interface means between said supply means and said printing means.

11. An apparatus according to claim 10, wherein said interface means includes an A/D converter.

12. An apparatus according to claim 6, wherein said control means includes:
means for generating a signal representing the amount printed by said printing means; and
means for mixing the signal generated by said generating means with the video signal to be supplied to said monitor.

13. An apparatus according to claim 12, wherein said printing means includes:
(a) holding means for sampling and holding data for printing out of the video signal; and
(b) means for determining the sampling timing of the holding means.

14. An apparatus according to claim 13, wherein said control means causes said monitor to display an information relative to the sampling timing.

15. An apparatus comprising:
(a) means for supplying a given video signal to a monitor to reproduce it as a visible image;
(b) printing means for recording said video signal on a recording medium; and
(c) control means for causing said monitor to display in synchronism with the printing operation of said printing means.

16. An apparatus according to claim 15, wherein said control means causing said monitor to display the synchronization point with the printing operation.

17. An apparatus according to claim 15, wherein said printing means includes:
means for sampling and holding data for the printing operation out of said video signal; and
wherein said control means causes said monitor to display an information relative to the sampling operation of the sampling and holding means

* * * * *